No. 727,877. PATENTED MAY 12, 1903.
R. AUSTIN.
RUBBER TIRE.
APPLICATION FILED FEB. 14, 1902.
NO MODEL.

WITNESSES:
J. A. Brophy
Walton Harrison

INVENTOR
Robert Austin
BY
ATTORNEYS

No. 727,877. Patented May 12, 1903.

UNITED STATES PATENT OFFICE.

ROBERT AUSTIN, OF BROOKLYN, NEW YORK.

RUBBER TIRE.

SPECIFICATION forming part of Letters Patent No. 727,877, dated May 12, 1903.

Application filed February 14, 1902. Serial No. 94,053. (No model.)

*To all whom it may concern:*

Be it known that I, ROBERT AUSTIN, a citizen of the United States, and a resident of the city of New York, borough of Brooklyn, in the county of Kings and State of New York, have invented new and useful Improvements in Rubber Tires, of which the following is a full, clear, and exact description.

My invention relates to solid rubber tires, more particularly of the kind used upon vehicles of all kinds and automobiles.

Reference is to be had to the accompanying drawings, forming a part of this specification, in which similar characters of reference indicate corresponding parts in all the figures.

Figure 1:
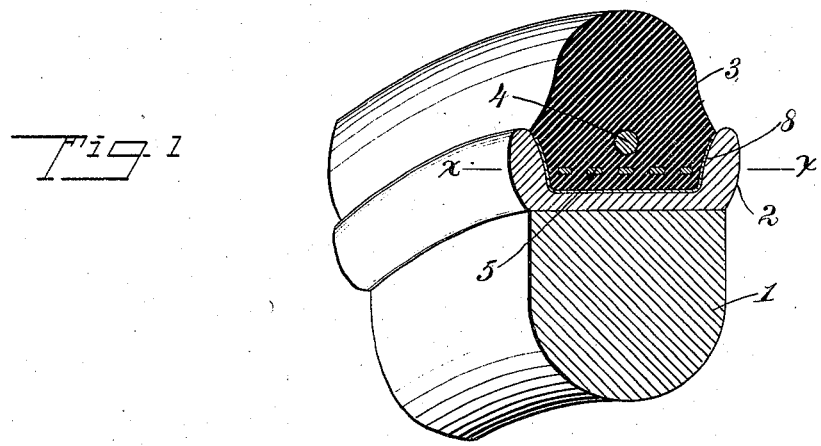
Figure 2:
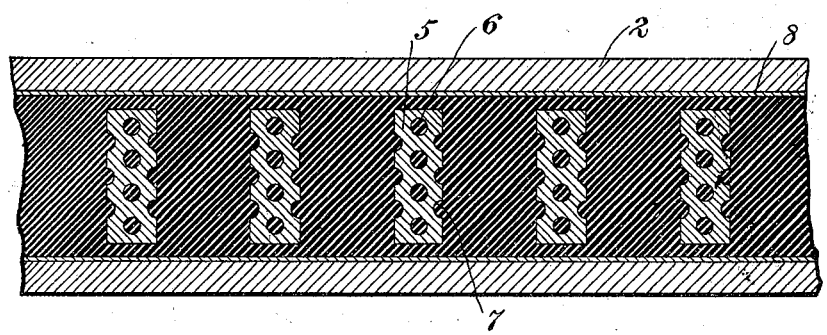
Figure 3:
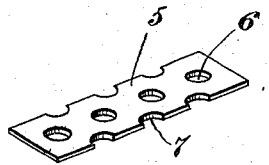

Figure 1 is a perspective view, partly in section, showing my invention as applied to a vehicle-wheel. Fig. 2 is a sectional view upon the line $x\,x$ in Fig. 1, and Fig. 3 is a perspective view of one of the plates used in the tire.

The wheel 1 is provided with a trough-shaped rim 2. The so-called "solid" tire 3 is provided centrally with an annular hoop 4, of spring metal, and with a series of plates 5, disposed after the manner of a mutilated circle, said circle being concentric with the general position of the hoop 4. Each of the plates 5 is provided with mutilations, preferably consisting of the circular holes 6 and the semicircular apertures 7. The plates are spaced asunder, as indicated in Fig. 2, and are also spaced from the hoop 4. The rubber is molded around the plates and hoop, so as to form a practically integral tire.

My tire has great advantages over those in use. The plates 5 act as bearing-plates and serve to distribute strains throughout the substance of the tire. Being disconnected from each other and spaced asunder, they do not interfere materially with the resiliency of the tire. The reason why the hoop 4 is centrally disposed is to distribute the strains upon the respective centers of the several plates. The piece of sheeting 8 is of the ordinary kind. The hoop 4 is located quite near the plates and is concentric to the mutilated circle formed thereby. When the hoop is forced toward a plate, the little thickness of rubber intervening does not prevent the strain from being communicated, yet as the metallic parts are all separated and completely buried in the rubber the resiliency of the tire as a whole is almost as great as would be the case if nothing but rubber were used. The strength and durability of the tire are increased to a degree far beyond the strength and durability of a tire composed entirely of rubber. As the rubber extends through the holes 6 and through the apertures 7, each plate is securely anchored and utterly unable to move in any direction from its general position. When after long use the tire begins to wear out and to become flabby, the hoop 4 by distributing strains through the several plates tends to hold the tire in appropriate shape.

It will be noted that the rim 2 of the wheel is substantially trough shape and that the plates are located below the top of the rim and terminate in the substance of the rubber, their ends thus being spaced from the trough so as to abut a surface of rubber, which thereby serves as a fastening for the plates. The hoop 4 is preferably disposed about on a level with the top of the trough. By this arrangement undue movements of the rubber relatively to the plates and to the hoop are avoided and much wear and tear upon the tire is prevented. I find that this arrangement of parts is calculated to make a tire last two to three times as long as otherwise would be the case and that the resiliency of tires made in this manner is but little, if any, inferior to that of tires made solely of rubber.

Having thus described my invention, I claim as new and desire to secure by Letters Patent—

A rubber tire, comprising an endless member of resilient material, provided with a series of bearing-plates spaced apart and completely buried therein, each of said plates being provided with central perforations, and also with mutilations upon its edges, for the purpose of anchoring both the central portions and the edges of said plates firmly within said resilient material, and a single wire disposed centrally within said resilient material and encircling all of said bearing-plates, said wire being totally disconnected from said plates and spaced asunder therefrom, so that said resilient material forms a cushion as between said bearing-plates and said wire.

In testimony whereof I have signed my name to this specification in the presence of two subscribing witnesses.

ROBERT AUSTIN.

Witnesses:
 MARVIN MCCAIN,
 T. VEEDER HESSER.